March 25, 1952 J. A. CAMPBELL 2,590,681
GAS SEPARATOR
Filed Dec. 8, 1949 2 SHEETS—SHEET 1
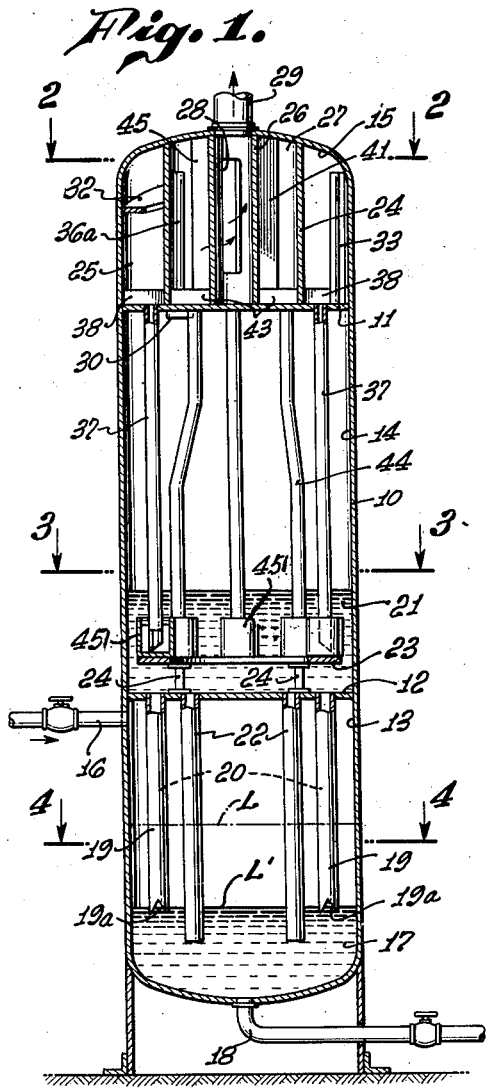
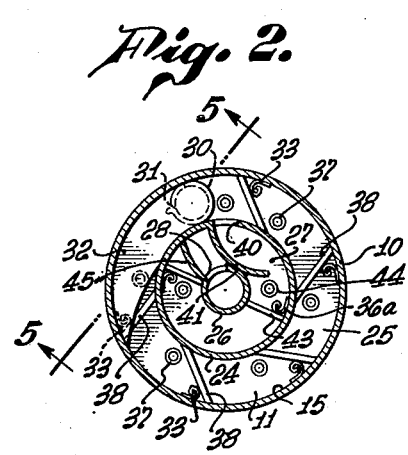
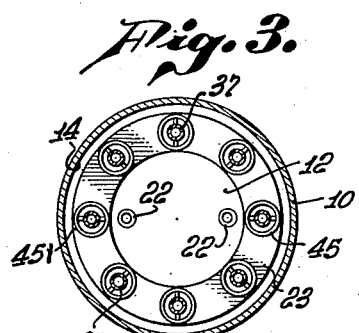
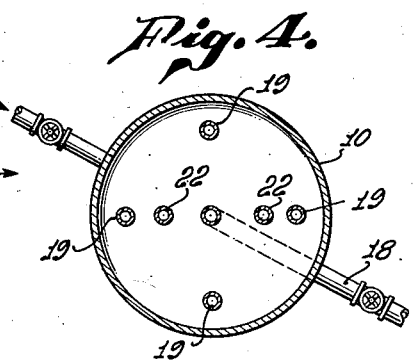
JULIAN A. CAMPBELL,
INVENTOR.
BY
ATTORNEY.

March 25, 1952  J. A. CAMPBELL  2,590,681
GAS SEPARATOR

Filed Dec. 8, 1949  2 SHEETS—SHEET 2

JULIAN A. CAMPBELL,
INVENTOR.

BY
ATTORNEY.

Patented Mar. 25, 1952

2,590,681

UNITED STATES PATENT OFFICE 2,590,681

GAS SEPARATOR

Julian A. Campbell, Long Beach, Calif.

Application December 8, 1949, Serial No. 131,741

9 Claims. (Cl. 183—22)

1

This invention has to do with improvements in separators operating to remove either or both dust and liquid particle entrainment from gases.

The variety of conditions encountered in the commercial separation of solid or liquid entrainment from gases, has presented great difficulties against the design of a separator capable of completely cleaning different gases under all circumstances. To illustrate, a given scrubber design, if properly sized, may be found to operate at virtually one hundred percent efficiency on a gas of limited entrainment content and flow rate, and yet be incapable of satisfactory performance if for any reason either the entrainment content or flow rate materially increase. The common tendencies for flooding by excessive liquid taken into the gas line, indicates the limited capacity of the usual scrubber. In other instances it develops that while a scrubber may give satisfactory performance, in its operating range, toward removing mist or liquid entrainment, the same type of separator may be inefficient for the extraction of dust from the gas.

My general object is to provide an improved separator, certain principles of which are applicable to both liquid and dust removing scrubbers, and which is capable consistently of top extraction efficiency notwithstanding wide or sudden variations in such conditions as the gas throughput rate, and the kind and quantity of entrainment carried by the gas. Also contemplated is an improved design capable of passing and cleaning the gas at great throughput rates, with low pressure drop between the separator inlet and outlet.

Whether built as a liquid or dust scrubber, the invention embodies a separator unit functioning to finally clean the gas and so constructed, particularly in relation to other parts of the equipment, as to assure removal of the entrainment throughout any changes in operation conditions. As will appear, the invention employs an essentially centrifugal type separator unit operating on the principle of so affecting the velocity and flow direction of the gas as to precipitate out all entrainment, and then promptly isolating the removed liquid to preclude the possibility of its becoming reentrained in the gas.

Of particular importance in dust removing scrubbers, the invention provides for the initial displacement of the scrubbing liquid and its thorough mixing with the gas, all under the influence of the gas pressure and flow rate, in a manner assuring entrapment in the liquid of the complete dust content of the feed gas. As will appear, such initial scrubbing of the gas invokes a continuous gas flow induced circulation of the liquid between lower and upper chambers in the separator, while the gas is kept in a state of intimate and continued mixing with the gas during concurrent rising flow from the lower into the upper chamber.

2

The various features of the invention as well as the details of an illustrative embodiment, will be fully understood from the following description of the accompanying drawings, in which:

Fig. 1 is a view showing in vertical section a separator for removing dust entrainment from the gas;

Figs. 2, 3 and 4 are cross sections taken respectively on lines 2—2, 3—3 and 4—4 of Fig. 1;

Figure 9:
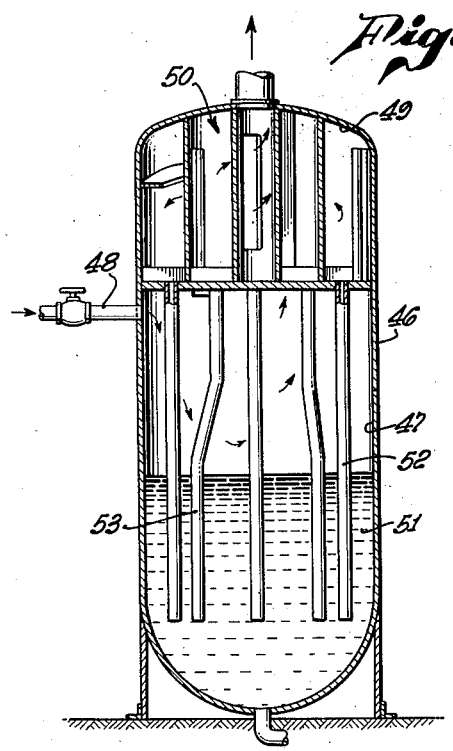
Fig. 9 is a view similar to Fig. 1 illustrating a mist extractor embodiment of the invention.

Referring first to Figs. 1 to 8, the form of the invention therein shown may be considered generally as comprising a vertically extending shell 10 containing transverse walls or floors 11 and 12 dividing the shell into a lower gas inlet chamber 13, an intermediate contact chamber 14 and a top separating chamber 15. Gas under pressure fed to chamber 13 through line 16 may be assumed to contain entrained dust particles and perhaps also entrained liquid particles or mist, in which event the liquid will be recovered along with the dust in a body 17 withdrawn from the base of the shell through the drain line 18. Where the separator is operating to separate dust from dry gas, the quantity of liquid required for scrubbing of the gas in the manner hereinafter described, may be introduced to and maintained in the separator.

Chamber 13 contains a circular arrangement of riser tubes 19 depending through the floor 12 within the liquid body 17, each tube containing a staggered arrangement of inwardly projecting baffles 20 acting to effect intimate admixture of the gas and liquid being displaced upwardly through the tube into the liquid body 21 in chamber 14. Chamber 13 also contains an appropriate number of drain tubes 22 depending through floor 12 to a depth somewhat below the notched inlet ends 19a of the riser tubes 19. Before introduction of the feed gas to chamber 13, the liquid body 17 will stand at a relatively elevated non-operating level L. Upon introduction of the gas, its pressure depresses the level L and displaces the liquid upwardly within the tubes, to a lower operating level L' at which the gas enters the lower end of the riser tubes 19, thence flowing upwardly therethrough and carring with it a constantly displaced portion of the liquid. Thus the gas initially is subjected to such thorough comingling with the liquid as will cause retention by the latter of entrained dust particles. The liquid so displaced upwardly into the body 21 in chamber 14, continuously drains back into chamber 13 through tubes 22, the lower ends of which are liquid sealed by reason of their dependency below the riser tubes 19.

Chamber 14 contains an annular baffle 23 carried on supports 24 in directly overlying relation to the riser tubes 19 so that the gas discharging upwardly therethrough is deflected by the baffle laterally within the liquid body 21, thus extending the path and time of the gas contact with the liquid, and correspondingly benefitting the degree of dust extraction accomplished by virtue of the liquid and gas contact.

The gas passing upwardly through the intermediate chamber 14, enters separating chamber 15 wherein all traces of liquid entrainment are removed, as will appear. The mist extractor assembly comprises an annular baffle 24 concentrically positioned in and annularly spaced from the shell 10 to form a circular separating passage 25 preferably of substantially 360° extent. Baffle 24 extends concentrically in spaced relation about an inner baffle or pipe 26 defining with baffle 24 a secondary separating passage 27 also preferably of about 360° extent, and from which the gas is discharged through opening 28 into pipe 26 and thence to the outlet 29.

Figure 5:
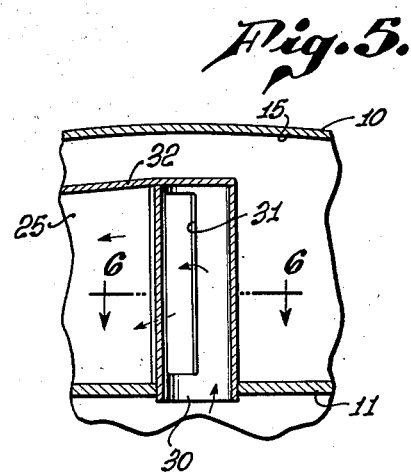
Fig. 5 is an enlarged fragmentary section on line 5—5 of Fig. 2.
Figure 6:
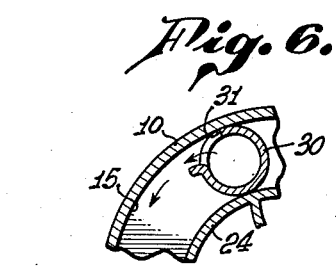
Fig. 6 is a section on line 6—6 of Fig. 5.
Figure 8:
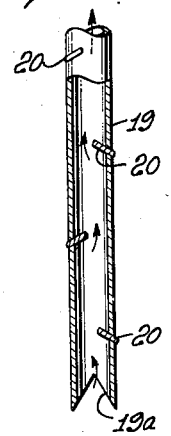
Fig. 8 shows a sectional enlargement of one of the liquid riser tubes.
Figure 7:
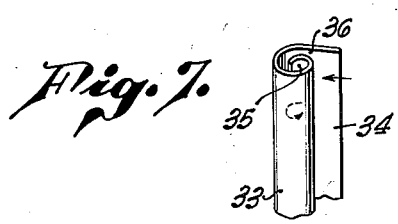
Fig. 7 is an enlargement of one of the catch pocket vanes.

From chamber 14 the gas rises through a pipe 30, see Fig. 5, into passage 25 and discharges through opening 31. In starting its flow counter-clockwise, as viewed in Fig. 2, the gas is given a progressive velocity increase by the placement in passage 25 of an inclined baffle 32, closing the upper end of pipe 30, the effect of the baffle being to impart to the mist particles, by reason of the increase in gas velocity, greater centrifugal force components tending to project the liquid outwardly against the inner surface of the shell. In keeping with the desirability of depositing as great as possible quantity of the entrained mist or liquid out of the gas onto a collecting surface, and of then isolating the deposited liquid against reentrainment in the gas, I provide along the course of the liquid deposition against the shell surface a series of vanes 33 forming catch pockets as more particularly illustrated in Fig. 7. Each vane has a portion 34 welded or otherwise secured to the shell, and from which the body of the vane is curved inwardly and throughout an extent in excess of 360° to form essentially a tubular pocket 35 through which liquid enters through a narrow mouth or gap at 36. Being directed against the open side of the vane, the gas flow tends to displace or drive the liquid accumulation against the shell surface, through the gap 36 into the quiescent interior of the pocket 35, wherein the liquid thus is effectively isolated against reentrainment. The separated liquid drains onto the floor 11 and thence is conducted downwardly through tubes 37 into chamber 14 below the liquid level therein. Liquid-carry-over along the floor from one to the next vane 33 is prevented by dams 38, the spaces between which are drained individually by the individual tubes 37.

After traversing a substantially 360° path within the passage 25, the gas flows through opening 40 into passage 27 within which the gas takes a reverse 360° flow past the catch pockets 36a before entering the opening 28 leading to outlet 29. Upon entering passage 27, the gas impinges against a baffle 41 which, together with the shell 24, progressively restricts and increases the velocity of the gas flow to thus accentuate the centrifugal throw-out of any mist particles remaining in the gas. As within the outer passage 25, the secondary separating passage 27 contains dams 43 from between which any liquid present is drained through tubes 44. If desired, a vane 45 may be placed in passage 27 to baffle the gas flow and produce a more abrupt change of its direction, just in advance of the opening 28.

As illustrated in Fig. 1, tubes 44 may be bent outwardly to bring their lower ends into circular alinement with the drain tubes 37. It is preferred to assure maintenance of a liquid seal at the bottoms of the tubes, and for this purpose I may place on the baffle 23 a circular series of open top seal cups 451 receiving the lower ends of the tubes 37 and 44.

For purposes of mist extraction alone, it may be unnecessary to make provision for initially contacting the gas with liquid, as in the described dust separator. Accordingly, the variational form of the invention shown in Fig. 9 is reduced essentially to the combination in shell 46 of a lower chamber 47 to which the gas is fed through inlet 48, and an upper chamber 49 containing the same mist extractor and baffle assembly, all generally denoted at 50, previously described as contained in the top chamber 15 of Fig. 1. The wet gas entering chamber 47 undergoes an extensive drop in velocity which results in some initial separation of liquid particles within the chamber for accumulation in the liquid body 51. The gas leaving the chamber passes through separator unit 50 wherein the liquid is removed and drained back into the liquid body 51 through tubes 52 and 53 corresponding respectively to tubes 37 and 44 in the first described form.

I claim:

1. A separator comprising a vertically extending shell, a transverse wall within and dividing the shell into a lower liquid-containing chamber and an upper separating chamber, a gas inlet discharging into said lower chamber and an outlet leading from said upper chamber, a baffle circularly spaced from the shell in said upper chamber to form a separating passage leading to said outlet, vanes forming circularly spaced entrainment catch pockets within and at the outside of said passage, dams projecting upwardly from the floor between said vanes, and liquid drain tubes extending through the floor at locations between said dams into the lower chamber.

2. A separator comprising a vertically extending shell, a transverse wall within and dividing the shell into a lower liquid-containing chamber and an upper separating chamber, a gas inlet discharging into said lower chamber and an outlet leading from said upper chamber, a baffle circularly spaced from the shell in said upper chamber to form a separating passage leading to said outlet, a second baffle forming a portion of the top of said passage and inclined in the direction of gas flow therein to progressively increase the gas velocity, a series of circularly spaced vertically extending curved vanes within and at the outside of said passage, said vanes being of transversely curved form to form entrainment catch pockets presenting narrow entrance openings against which the gas flow is directed.

3. A separator comprising a vertically extending shell, a transverse wall within and dividing the shell into a lower liquid-containing chamber and an upper separating chamber, a gas inlet discharging into said lower chamber and an outlet leading from said upper chamber, an outer baffle circularly spaced from the shell in the upper chamber to form a first separating passage communicating with said lower chamber, an inner baffle within and circularly spaced from said outer baffle to form a second separating passage discharging to said outlet, means connecting said passage so that the gas flowing circularly in the first passage then has reverse circular flow in the second passage, and tubes for draining separated liquid from said passages into the lower chamber.

4. A separator comprising a vertically extending shell, upper and lower spaced transverse walls dividing the shell into a lower chamber containing a body of liquid, an intermediate chamber and an upper separating chamber, a gas outlet discharging into said lower chamber and an outlet leading from the upper chamber, tubes depending through said lower wall into the liquid body and through which liquid is displaced upwardly into the intermediate chamber by gas pressure depression of the level of said liquid body, return tubes for draining liquid from the intermediate chamber back into the lower chamber, entrainment separation means in said upper chamber, and means directing the gas from said intermediate chamber through said separating means to the outlet.

5. A separator comprising a vertically extending shell, upper and lower spaced transverse walls dividing the shell into a lower chamber containing a body of liquid, an intermediate chamber and an upper separating chamber, a gas inlet discharging into said lower chamber and an outlet leading from the upper chamber, tubes depending through said lower wall into the liquid body and through which liquid is displaced upwardly into the intermediate chamber by gas pressure depression of the level of said liquid body, baffle means overlying said tubes and acting to disperse the gas rising therethrough laterally within liquid in the intermediate chamber, return tubes for draining liquid from the intermediate chamber back into the lower chamber, entrainment separating means in said upper chamber, and means directing the gas from said intermediate chamber through said separating means to the outlet.

6. A separator comprising a vertically extending shell, upper and lower spaced transverse walls dividing the shell into a lower chamber containing a body of liquid, an intermediate chamber and an upper separating chamber, a gas outlet discharging into said lower chamber and an outlet leading from the upper chamber, tubes depending through said lower wall into the liquid body and through which liquid is displaced upwardly into the intermediate chamber by gas pressure depression of the level of said liquid body, return tubes for draining liquid from the intermediate chamber back into the lower chamber, entrainment separation means in said upper chamber, means directing the gas from said intermediate chamber through said separating means to the outlet, and tubes for draining liquid from said separating means and upper chamber into the shell below.

7. A separator comprising a vertically extending shell, upper and lower spaced tranverse walls dividing the shell into a lower chamber containing a body of liquid, an intermediate chamber and an upper separating chamber, a gas inlet discharging into said lower chamber and an outlet leading from the upper chamber, tubes depending through said lower wall into the liquid body and through which liquid is displaced upwardly into the intermediate chamber by gas pressure depression of the level of said liquid body, baffle means overlying said tubes and acting to disperse the gas rising therethrough laterally within liquid in the intermediate chamber, return tubes for draining liquid from the intermediate chamber back into the lower chamber, entrainment separating means in said upper chamber, means directing the gas from said intermediate chamber through said separating means to the outlet, and tubes draining liquid from said separating means and upper chamber into the liquid in said intermediate chamber above said baffle means.

8. A separator comprising a vertically extending shell, upper and lower spaced transverse walls dividing the shell into a lower chamber containing a body of liquid, an intermediate chamber and an upper separating chamber, a gas inlet discharging into said lower chamber and an outlet leading from the upper chamber, tubes depending through said lower wall into the liquid body and through which liquid is displaced upwardly into the intermediate chamber by gas pressure depression of the level of said liquid body, means for draining liquid from the intermediate chamber back into the lower chamber, separating means in said upper chamber comprising walls forming an outer circular separating passage having an inlet from said intermediate chamber and a communicating inner circular separating passage connecting with said outlet, and return tubes for draining liquid separately from said passages into the shell below.

9. A separator comprising a vertically extending shell, upper and lower spaced transverse walls dividing the shell into a lower chamber containing a body of liquid, an intermediate chamber and an upper separating chamber, a gas inlet discharging into said lower chamber and an outlet leading from the upper chamber, tubes depending through said lower wall into the liquid body and through which liquid is displaced upwardly into the intermediate chamber by gas pressure depression of the level of said liquid body, means for draining liquid from the intermediate chamber back into the lower chamber, separating means in said upper chamber comprising walls forming an outer circular separating passage having an inlet from said intermediate chamber and a communicating inner circular separating passage connecting with said outlet, a baffle in said intermediate chamber overlying said tubes and acting to disperse gas rising therethrough laterally within liquid in the intermediate chamber, liquid seal means carried on said baffle, and drain tubes depending from said separating passages into said seal means.

JULIAN A. CAMPBELL.

REFERENCES CITED

The following references are of record in the file of this patent:

UNITED STATES PATENTS

| Number | Name | Date |
|---|---|---|
| 1,573,135 | Bourne et al. | Feb. 16, 1926 |
| 1,767,324 | Tasker | June 24, 1930 |
| 1,783,813 | Schneible | Dec. 2, 1930 |
| 1,920,437 | Sillers | Aug. 1, 1933 |
| 2,288,245 | Kopp | June 30, 1942 |
| 2,354,674 | Fisher | Aug. 1, 1944 |
| 2,358,508 | Hersh | Sept. 19, 1944 |